United States Patent [19]

Gore et al.

[11] Patent Number: 5,252,279
[45] Date of Patent: Oct. 12, 1993

[54] METHOD FOR MAKING PERFORATED ARTICLES

[75] Inventors: Gerald W. Gore, Placentia; Philip H. Milner, Jr., Newport Beach; Gordon A. Petersen, Fountain Valley, all of Calif.

[73] Assignee: Reinhold Industries, Santa Fe Springs, Calif.

[21] Appl. No.: 642,641

[22] Filed: Jan. 17, 1991

[51] Int. Cl.$^5$ .................. B29D 19/08; B29C 67/14
[52] U.S. Cl. .................. 264/154; 264/225; 264/257; 264/295; 264/313
[58] Field of Search .......... 264/154, 155, 156, 255, 264/257, 258, 313, 316, 294, 295, 220, 225

[56] References Cited

U.S. PATENT DOCUMENTS

| | | | |
|---|---|---|---|
| 3,704,194 | 11/1972 | Harrier | 264/313 |
| 3,787,546 | 1/1974 | Pratt et al. | 264/257 |
| 4,337,106 | 6/1982 | Wheeler | 156/228 |
| 4,452,335 | 6/1984 | Mathews et al. | 181/214 |
| 4,486,372 | 12/1984 | Millard et al. | 264/156 |
| 4,612,737 | 9/1986 | Adee et al. | 51/310 |

FOREIGN PATENT DOCUMENTS

2064412A 6/1981 United Kingdom .

Primary Examiner—Jay H. Woo
Assistant Examiner—Robert B. Davis
Attorney, Agent, or Firm—Knobbe Martens Olson & Bear

[57] ABSTRACT

The present invention is a method of producing perforated articles. A woven material, such as woven graphite, is impregnated with a curable high flow resin, such as epoxy or BMI resin, and placed on a pressure transmitting pad which has stud holes positioned and sized so as to permit the studs of a flexible mold to fit therein. The material can be smoothed over the pad using a roller. The studded flexible mold, which can be of polypropylene, polyethylene or PEEK, is then applied, pushing the studs through the woven material and into the stud holes. The pressure transmitting pad is removed and the flexible mold with the woven material thereon is formed to a desired contour, such as through placing the mold on a forming tool, followed by partially curing the resin impregnated in the woven material until the impregnated resin material has sufficient structural integrity to permit removal from the mold without permanent deformation. The partially cured woven material can then be removed from the mold and the curing finished. The process may be modified to create multi-layer laminate structures through the application of additional layers prior to curing. The process may be further modified to create larger articles by joining a plurality of mold sections.

19 Claims, 6 Drawing Sheets

METHOD FOR MAKING PERFORATED ARTICLES

BACKGROUND OF THE INVENTION

The present invention relates generally to the field of perforated articles. More specifically, the present invention relates to a method of fabricating perforated articles in a desired contour or shape.

In many applications, it is desired to form articles of varying shapes with perforations therein, such as acoustic panels for aerospace applications. These panels have been produced from epoxy resin impregnated woven fabrics using a variety of different perforation techniques, such as through drilling. However, drilling is not desirable because such action impairs the load bearing ability of the panels. Accordingly, others have attempted to produce perforations in acoustic panels through molding.

U.S. Pat. No. 4,486,372 teaches one method of making a contoured perforated structure through molding of low flow epoxy resin impregnated woven graphite sheets. In this method, a sheet impregnated with low flow epoxy resin is placed over a mold surface having pins thereon. The sheets are then forced onto the pins and partially cured in the flat configuration of the mold. Thereafter, the partially cured sheets are removed, formed into a desired final configuration and cured again to provide a final cure. Since the method requires forming after partial curing, the partial cure step must not cure the resin so much that the partially cured material cannot be bent into the desired form. On the other hand, the partial cure step must cure the resin sufficiently to prevent the resin from flowing into the perforations upon removal from the mold and to prevent damage or deformation of the sheets upon such removal. However, as far as can be ascertained by the Applicants, if the resin is cured sufficiently to be successfully removed from the studded mold, the material is so rigid that it cannot be successfully formed to produce contoured parts. On the other hand, if the resin is cured sufficiently little so as to be formable into contoured parts, the material cannot be removed without distortion and deformation, resulting in an unacceptable part.

The method of U.S. Pat. No. 4,486,372 attempts to alleviate the foregoing problems by using a low flow resin which is less likely to flow after partial cure. However, the use of low flow resin, which is substantially harder than high flow resin, creates difficulties in forcing the resin impregnated material onto the mold and in smoothing out the material on the mold.

SUMMARY OF THE INVENTION

Briefly, the present invention provides a method of manufacturing a perforated article, comprising impregnating a woven material, which is preferably woven graphite, with a high flow curable resin, which is preferably epoxy resin, polyimide resin or BMI resin, providing a flexible mold with a generally smooth mold surface with a plurality of spaced studs projecting therefrom, and providing a pressure transmitting pad having a generally smooth pad surface with stud holes therein positioned and sized so as to permit the studs on the flexible mold to fit within the stud holes. The flexible mold is preferably formed from polypropylene, polyethylene or PEEK. Thereafter, the method continues by laying the woven material over the pressure transmitting pad, optionally smoothing the woven material over the pressure transmitting pad using a roller, laying the flexible mold over the woven material, aligning the studs in the flexible mold with the stud holes, applying pressure to the resulting composite structure so as to push the studs through the woven material into the stud holes, removing the pressure transmitting pad, forming the flexible mold having the woven material thereon to a desired contour by placing the flexible mold on a forming tool having the desired contour, curing the curable resin impregnated in the woven material to substantially complete partial cure while the mold is in the desired contour, removing the woven material from the flexible mold after substantially complete partial cure of the resin, and finishing the curing of the curable resin. The removal step is preferably performed while the mold is at a temperature of at least 100° F. Preferably, the substantially completely partially cured woven material is replaced onto the forming tool after it is removed from the mold and before the curing is finished. Also preferably, the perforated article is in the same configuration after the substantially complete partial cure step as after the finishing step.

In a preferred embodiment of the method, additional impregnated woven material layers are applied through the repetition of the impregnating step and the steps between laying the woven material over the transmitting pad and the removing of the pad, inclusive, prior to forming the mold to the desired contour. The method also optionally includes laying a resin sheet over the pressure transmitting pad, laying the flexible mold over the resin sheet, aligning the studs in the flexible mold with the stud holes in the pressure transmitting pad, thereby forming a composite structure, applying pressure to the composite structure so as to push the studs through the resin sheet into the stud holes, and removing the pressure transmitting pad prior to the forming step, followed by applying a wire mesh to the perforated article.

In an especially preferred embodiment, the flexible mold is constructed from a plurality of mold sections, with the flexible mold having a size and shape such that the flexible mold can completely cover the portions of the woven material which will form the perforated article when those portions of the material are laid flat.

The transmitting pad can be produced by a method comprising providing slightly flexible hard material in uncured form, applying the flexible mold to the uncured resin, curing the uncured flexible hard material, and removing the flexible mold In one aspect of the present invention, there is provided a method of forming a large perforated article having a desired contour from a piece of flat woven material impregnated with curable resin, comprising constructing a flexible mold having a plurality of spaced studs thereon by joining a plurality of mold sections each having a plurality of spaced studs thereon, the flexible mold having a size and shape such that the flexible mold can completely cover the portions of the flat woven material from which the article is to be formed, applying the woven material to the flexible mold, forcing the woven material onto the studs so that the studs protrude through the woven material, and curing the high flow resin when the material is in the desired contour. Preferably, the flexible mold is cut to the shape of the portions of the material from which the article is to be formed and the portion of the material other than the portions of the material from which the article is to be formed are removed prior to curing.

Preferably the forcing step of this aspect of the invention comprises forcing a pressure transmitting pad having a plurality of spaced holes sized and spaced to receive the studs onto the mold. The pressure transmitting pad is preferably produced by a method comprising providing slightly flexible hard material in uncured form, applying the flexible mold to the uncured material, curing the uncured flexible hard material, and removing the flexible mold. The method preferably additionally comprises cutting the flexible mold to the shape of the portions of the material from which the article is to be formed with the pad being produced after the mold is cut. The curing step is preferably a substantially complete partial curing step and the method additionally comprises removing the woven material from the mold and completing the curing of the woven material. In the preferred embodiment of this aspect of the invention, the high flow resin comprises an epoxy resin or BMI resin, and the flexible mold comprises a material selected from the group consisting of polypropylene, polyethylene and PEEK.

In another aspect of the present invention, there is provided a method of manufacturing a perforated article, comprising forming a flexible mold by joining a plurality of mold sections having male and female joints thereon, the male and female joints capable of cooperating to join one mold section to another mold section, applying a material impregnated with resin to the flexible mold such that the portions of the material to be perforated do not extend beyond the edges of the flexible mold, using a forming tool to bend the flexible mold to a desired shape, curing the resin to substantially complete partial cure after the bending step, such that the material conforms to the forming tool during the curing step, and removing the material from the flexible mold after the curing step. The joints are preferably selected from the group consisting of tongue and groove joints, pinned lap joints and dovetail joints. Preferably, the removing step is performed while the mold is at a temperature between 100° F. and 250° F. and the curing step is performed at a temperature below the cure temperature of the resin, more preferably at a temperature between 250° and 300° F. In the preferred embodiment, the mold sections are square and two adjacent sides of the square have female joints and the other two adjacent sides have male joints. In this preferred embodiment, the resin comprises a high flow resin and the material comprises woven graphite.

DETAILED DESCRIPTION OF THE PREFERRED EMBODIMENT

Figure 1:
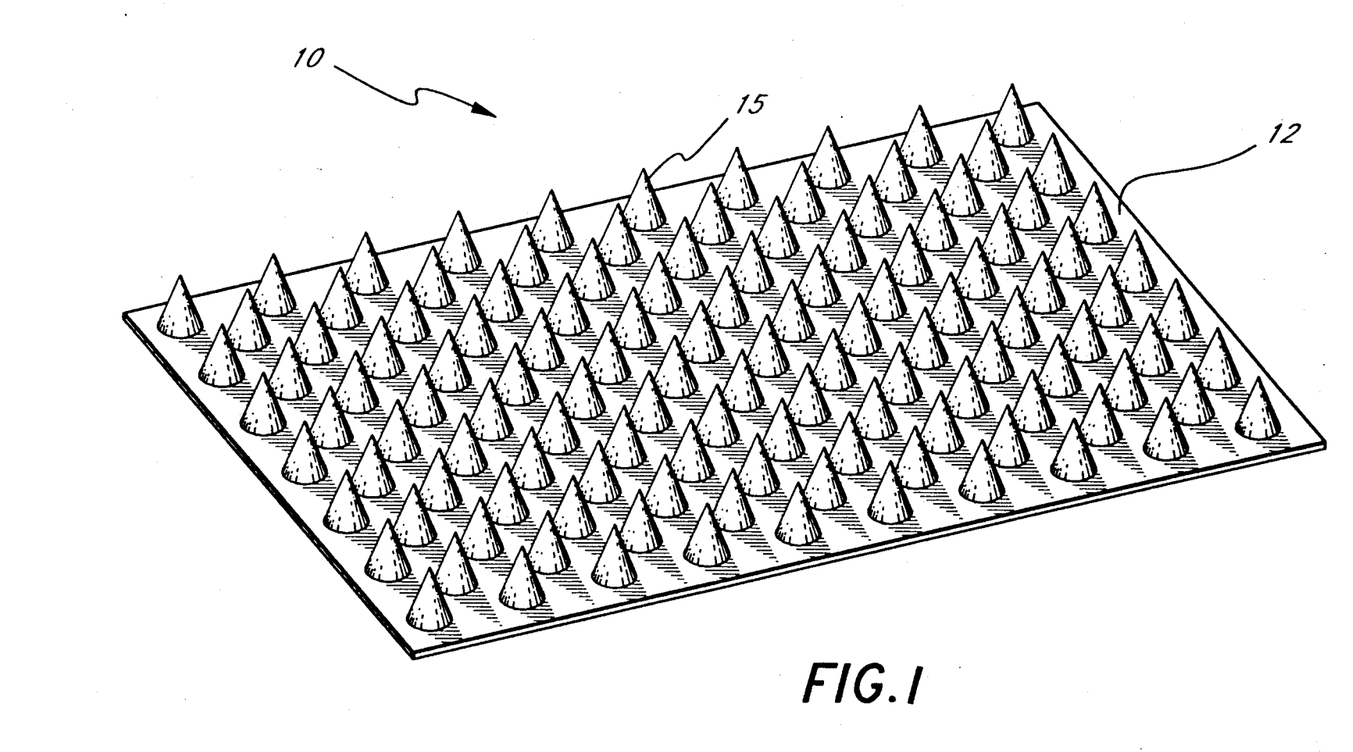
FIG. 1 is a perspective view of a flexible mold used in the method of the present invention.

Referring now to the drawings in detail, wherein like reference numerals designate like elements throughout the several views thereof, there is shown generally at 10 in FIG. 1, a flexible mold useful in the practice of a preferred form of the method of the present invention. The flexible mold 10 may be formed of any flexible material capable of withstanding temperatures for curing the resin used in the production of the perforated articles of the present invention, as discussed hereinbelow. However, preferably, the flexible mold 10 is formed from a thermoplastic material such as polypropylene, polyethylene or polyether ether ketone (PEEK). A mold 10 formed from PEEK is believed to be capable of withstanding repeated use without significant deterioration. However, polyethylene and polypropylene molds generally can only be used once when used in accordance with the method of the present invention.

The flexible mold 10 has a generally smooth mold surface 12 with a plurality of spaced studs 15 projecting therefrom. In the preferred embodiment, the studs 15 are tubular in shape with a conical structure at their distal ends to form a point. However, the studs 15 can also be conical in shape, as shown. The studs 15 project in a direction perpendicular to the mold surface 12 in order to facilitate both application of materials to the mold 10 and removal of materials from the mold 10. The number and size of the studs 15 are determined by the number and size of perforations desired in the product produced from the mold 10. The height of the studs 15 is preferably not higher than 1/10 inch in order to avoid deformation and breakage of the studs 15.

The mold can optionally be coated with a silicone, polyethylene or other lubricant which facilitates removal of the cured perforated product.

Figure 2:
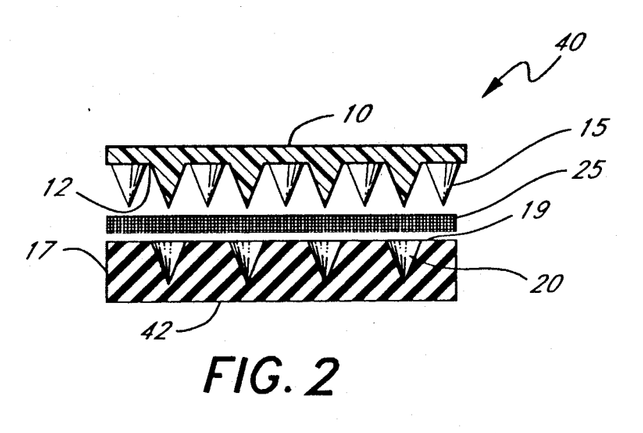
FIG. 2 is a sectional view of a composite structure of a flexible mold, a fabric sheet and a pressure transmitting pad, the view of the flexible mold being taken across line 2—2 in FIG. 1.

As seen in FIG. 2, in the preferred method of the present invention, a pressure transmitting pad 17 is provided for forcing materials onto the mold 10. The pad 17 used in the preferred method can be formed from any of a variety of relatively hard materials, such as metal or plastic. However, preferably, the pad 17 is formed from vulcanized rubber or other slightly flexible hard material in order to facilitate application to the mold 10.

The pad 17 has a generally smooth pad surface 19 and has a plurality of stud holes 20 that are positioned and sized to permit registration of the studs 15 of the mold 10 so that the studs 15 fit therein. In the embodiment depicted in FIG. 2, the stud holes 20 are conically shaped cavities sized and configured to mate with the studs 15.

The pad 17 can be produced by providing the slightly flexible hard material in uncured form and applying the flexible mold 10 thereto as a mold. After curing of the material, the flexible mold 10 is removed, leaving a pad 17 with holes 20 appropriately sized and configured to mate with the flexible mold 10.

Figure 7:
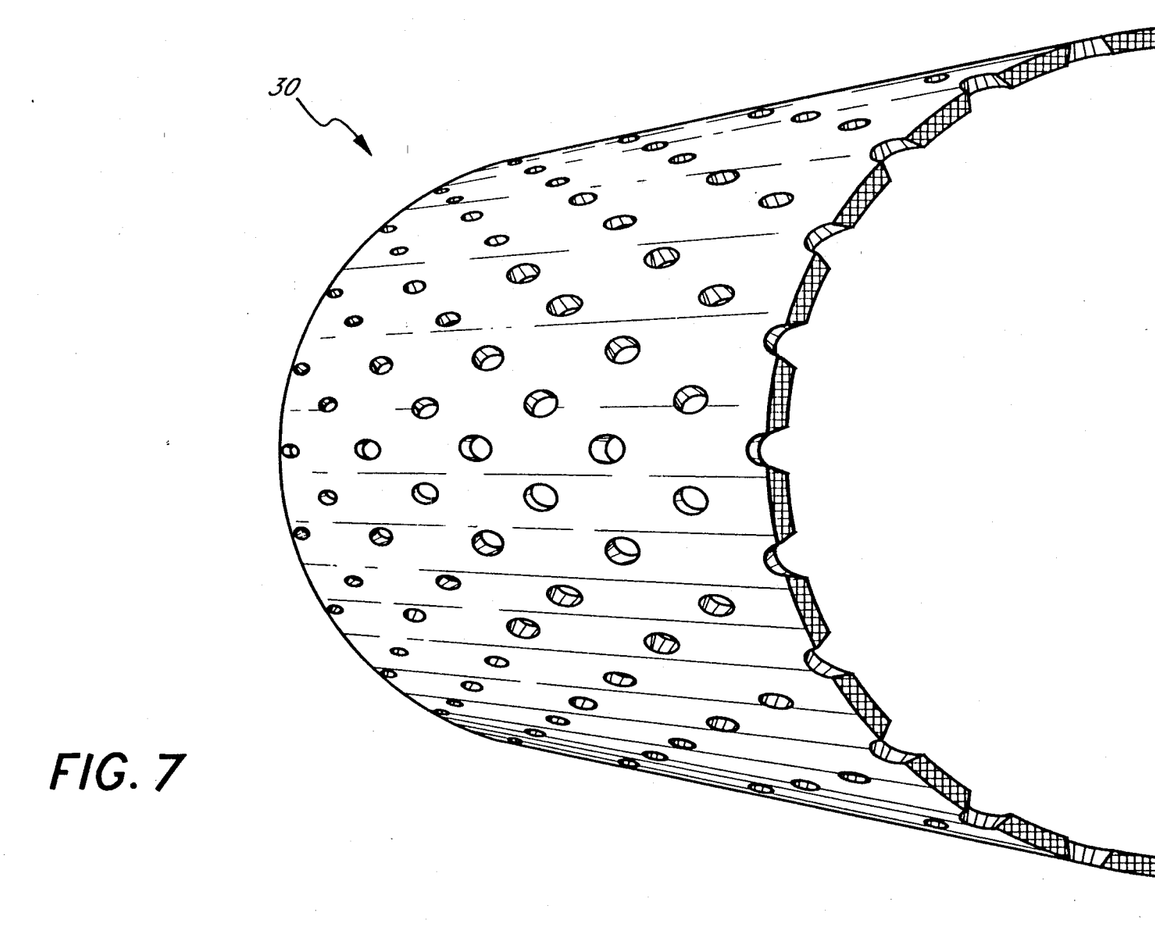
FIG. 7 is a perspective view of a perforated article of the present invention.

A woven material 25, such as a fabric sheet, will form the structural component of the finished perforated article 30 produced by the method of the present invention. An example of such a finished article 30 is shown in FIG. 7. The woven material 25 can be produced from any material capable of being made into fibers, and will depend upon the ultimate usage of the perforated product 30 to be formed. However, for a preferred perforated product useful as acoustic panels in aerospace applications, woven graphite is used as the woven material 25.

The woven material 25 is impregnated with a curable resin. This can be done by soaking the material 25 in the resin prior to use. Alternatively, pre-impregnated sheets of woven materials, known as "pre-preg" are available commercially from a variety of manufacturers, including Fiberite of Tempe, Ariz., Hexcel of Dublin, Calif. or Ciba-Geigy of Anaheim, Calif. Any of a variety of curable resins can be used, depending on the structural properties desired in the finished product 30. Preferred resins include epoxy resin, polyimide resin and bismaleimide resin (BMI) resin. BMI resin is especially preferred in applications where high temperatures are developed, such as commercial and military aircraft engines, because of its high capacity to resist thermal breakdown.

In contrast to some prior art methods of producing perforated articles, the method of the present invention advantageously permits use of a high flow resin. As used herein, a "high flow resin" is a resin having greater than 18% flow. A resin having 18% or less flow is referred to herein as a "low flow resin."

High flow resin is preferred regardless of the resin material selected, because high flow resin is less hard and allows for easier penetration of the studs 15 into the material 25 impregnated with the high flow resin. Conversely, application of materials impregnated with low flow resin is difficult and can result in deformation of the studs 15. As described hereinbelow, use of a high flow resin is made possible by the fact that the present invention permits partial curing to proceed to a much higher degree of curing, e.g., to a nearly complete cure.

Figure 3:
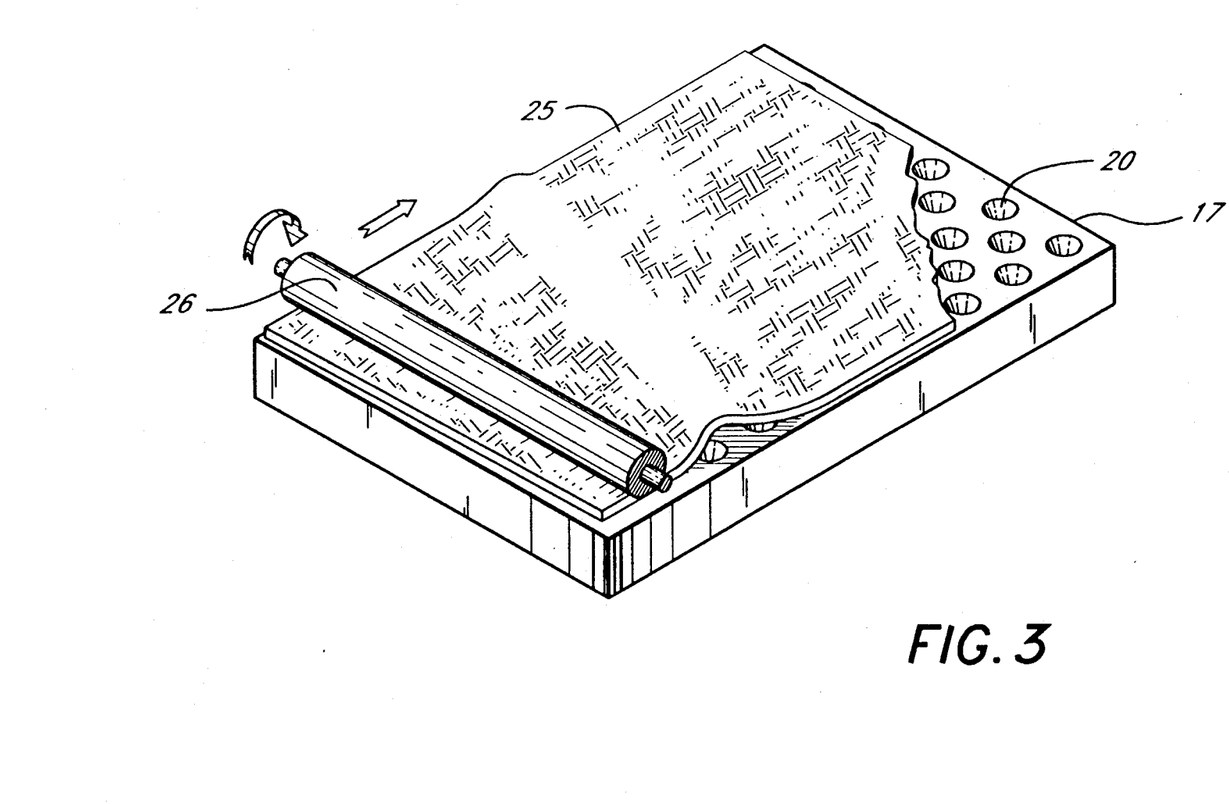
FIG. 3 is a schematic representation of an impregnated fabric sheet being smoothed out on a pressure transmitting pad in accordance with a preferred method of the present invention.

In the method of the present invention, the woven material 25 is forced onto the studs 15 of the mold 10, so that the studs 15 protrude through the woven material. In the preferred method, the resin impregnated woven material 25 is initially laid over the pad surface 19 of the pad 17. Preferably the material is slightly heated, e.g. to approximately 120°-160° F., in order to soften the resin, thereby allowing for easier penetration by the studs 15. Laying the woven material 25 over the smooth surface of the pad 17, advantageously allows the material 25 to be smoothed by being rolling out, for example, through the use of a teflon roller 26, shown schematically in FIG. 3. A smooth surface is desirable in many applications, including those applications where a perforated laminate of several layers of woven material or other materials are desired, as discussed hereinbelow.

After the impregnated woven material 25 is smoothed out over the pad surface 19, the flexible mold 10 is placed over the pad 17, aligning the studs 15 with the stud holes 20, so that the material 25 is sandwiched between pad 17 and mold 10, thereby forming a composite sandwich structure shown generally at 40 in FIG. 2. Pressure is applied to the structure 40 in order to force the material 25 onto the studs 15 of the mold 10, such that the studs 15 penetrate the material 25 and fill the complementary conical stud hole cavities 20 in the pad 17. This pressure can be applied from either side of the structure 40. However, in the preferred embodiment, pressure is applied from the outer surface 42 of the pad 17, the outer surface being the exposed surface away from the pad surface 19. Pressure should be applied uniformly in a direction parallel to the studs 15 and stud holes 20 in order to assure even penetration of the studs 15 into the material 25.

Figure 4:
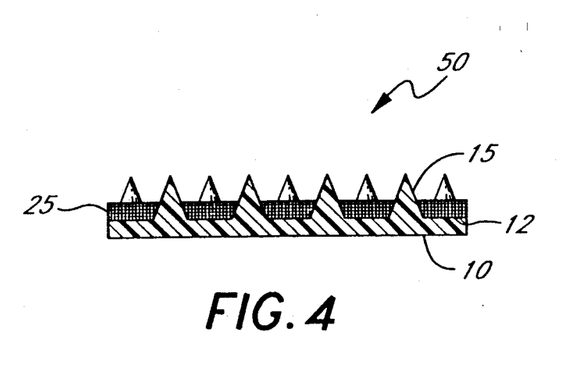
FIG. 4 is a sectional view of a flexible mold with a fabric sheet thereon resulting from the composite structure of FIG. 2 after the sheet of fabric impregnated with curable resin has been forced onto the flexible mold and after the pressure transmitting pad has been removed.

After pressure is applied, the pad 17 is removed, resulting in the flexible molding structure shown generally at 50 in FIG. 4 in which the material 25 is perforated by the studs 15 and is resting on the mold surface 12.

Optionally, after removal of the pad 17, additional layers of material can be applied to form a laminate structure. For example, additional layers of impregnated woven material (not shown) can be applied over the first layer of impregnated material 25, and the steps described above repeated. For other applications it may be desired to apply a layer of resin sheet to provide a smoother surface for application of other materials after curing, such as a wire mesh. A wire mesh is desirable in certain applications to provide for increased structural rigidity and additional acoustic damping. Advantageously, through the use of the method of the present invention herein described, a smooth layer of resin can be applied to the material 25 by rolling out the resin sheet as described above in connection with the first layer of material 25.

Figures 5, 6:
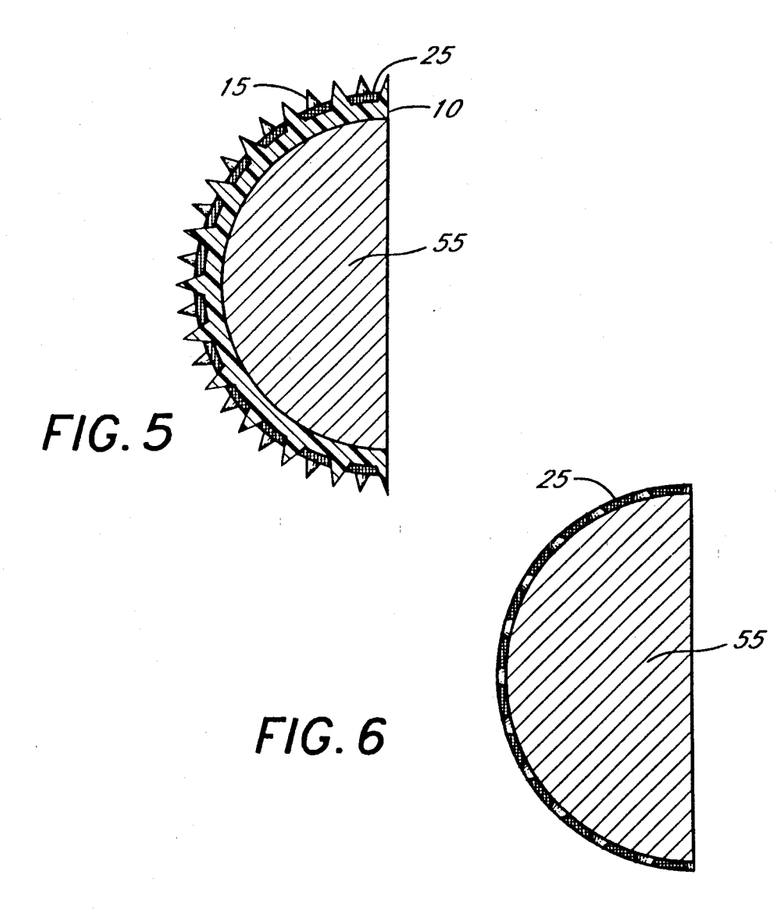
FIG. 5 is a sectional view of the flexible mold with a fabric sheet thereon of FIG. 4 contoured onto a forming tool.
FIG. 6 is a sectional view of the forming tool with a partially cured fabric sheet thereon.

Prior to any curing of the material 25, the entire flexible molding structure 50 is shaped to a desired contour. Advantageously, this can be accomplished by placing the flexible structure 50 on a forming tool 55 which is pre-formed to the desired shape. In this regard, the structure 50 can be placed on the forming tool 55 and bent to the contour of the forming tool 55, as shown in FIG. 5. The forming tool 55 is advantageously constructed of a material, such as metal, which can be heated at the curing temperature of the resin without significant decay to provide for multiple use. While the forming tool shown in FIG. 6 provides for a semi-cylindrical contour, it will be understood that any desired simple or complex shape can be provided through the provision of a forming tool of appropriate contour.

After forming, the contoured structure 50 is heated in order to effect substantially complete partial cure of the resin. By "substantially complete partial cure", it is meant that curing proceeds to create a substantially rigid product. In the preferred embodiment, it is intended that the substantially complete partial cure be at least a nearly complete cure, preferably at least 90% cured. It has been found that substantially complete partial curing at a temperature below the resin cure temperature (i.e., the temperature recommended for complete cure of the resin by the manufacturer) under the high pressure of an autoclave can result in the required substantially rigid product. In the preferred embodiment, the flexible mold 10 is not capable of withstanding the cure temperature of the resin and thus, substantially complete partial curing at such relatively low temperatures also prevents deformation and degradation of the flexible mold 10. For materials preimpregnated with epoxy resins, such as Fiberite 934 and Ciba-Geigy 6376, we have found that curing at 250°–300° F. for 2½ to 5 hours produces an appropriate degree of substantially complete partial curing. For high temperature resins, such as Hexcel F-650 BMI resin, 300° F. for 24 hours has been found appropriate to produce substantially complete partial cure. In some applications, sufficient curing will be produced by the substantially complete partial curing step that no additional curing is required.

Preferably, the substantially complete partial cure step is performed with the contoured structure 50 remaining on the forming tool 55 in order to maintain the desired contour. To further facilitate maintenance of the desired contour and to maintain a constant thickness of the material 25, the substantially complete partial curing step can be performed in an autoclave to provide pressure on the contoured structure 50. When autoclaving is used, preferably, the structure 50 is protected with a lining, such as a nylon or PVA bag. In the preferred embodiment, a layer of rubber is placed between the bag and the flexible mold 10 so that the studs 15 of the mold 10 do not rupture the bag.

After substantially complete partial curing, the contoured structure 50 can be readily removed from the mold. Preferably, the structure 50 is removed before the mold 10 has cooled to room temperature, and is preferably removed while the mold is at a temperature in the range 100° to 250° F. in order to facilitate removal of the structure 50 by increasing the flexibility of the flexible mold 10. Optionally, if the mold 10 has cooled below approximately 100° F., the mold can be slightly heated to approximately the preferred temperature range for removal of the structure 50. Through flexing of the mold 10, the partially cured perforated product 60 can be readily removed without hole damage or other deformation because the partially cured product 60 is substantially rigid.

Because substantially complete partial curing results in a substantially rigid product 60, the use of high flow resin in accordance with the preferred embodiment of the present invention creates no difficulties during removal of the product 60 from the mold. The resin in the product 60 will no longer substantially flow, thus, eliminating the need for the use of low flow resin and its attendant problems as discussed hereinabove.

In the preferred embodiment, after removal of the substantially rigid perforated product 60, the product 60 is placed back on the forming tool 55, as shown in FIG. 6, to help the product 60 maintain its shape during a final cure, if necessary. The final cure then proceeds without the need for high pressure from an autoclave because the product 60 already has sufficient structural integrity to maintain its shape. The final cure can then proceed at the full temperature recommended by the manufacturer for curing of the resin, i.e. at least 350°, because there is no longer a concern for deforming or degrading the flexible mold 10 which is no longer present. For a preferred embodiment using Fiberite 934 pre-preg material, the final cure temperature is 350° F., and for the Hexcel F-650 material, the final cure is at 450° F. The finished product will then be a perforated product having the desired contour, such as the product 30 shown in FIG. 7. The product is then cooled and is ready for further processing or use.

If it is desired to apply further materials to the product 30, such as wire mesh, adhesive can be applied to the finished product 30 in a manner which will not block the perforations of the product 30. For example, adhesive spray can be applied. After application of the adhesive, the further materials are bonded to the product 30.

Figure 11:
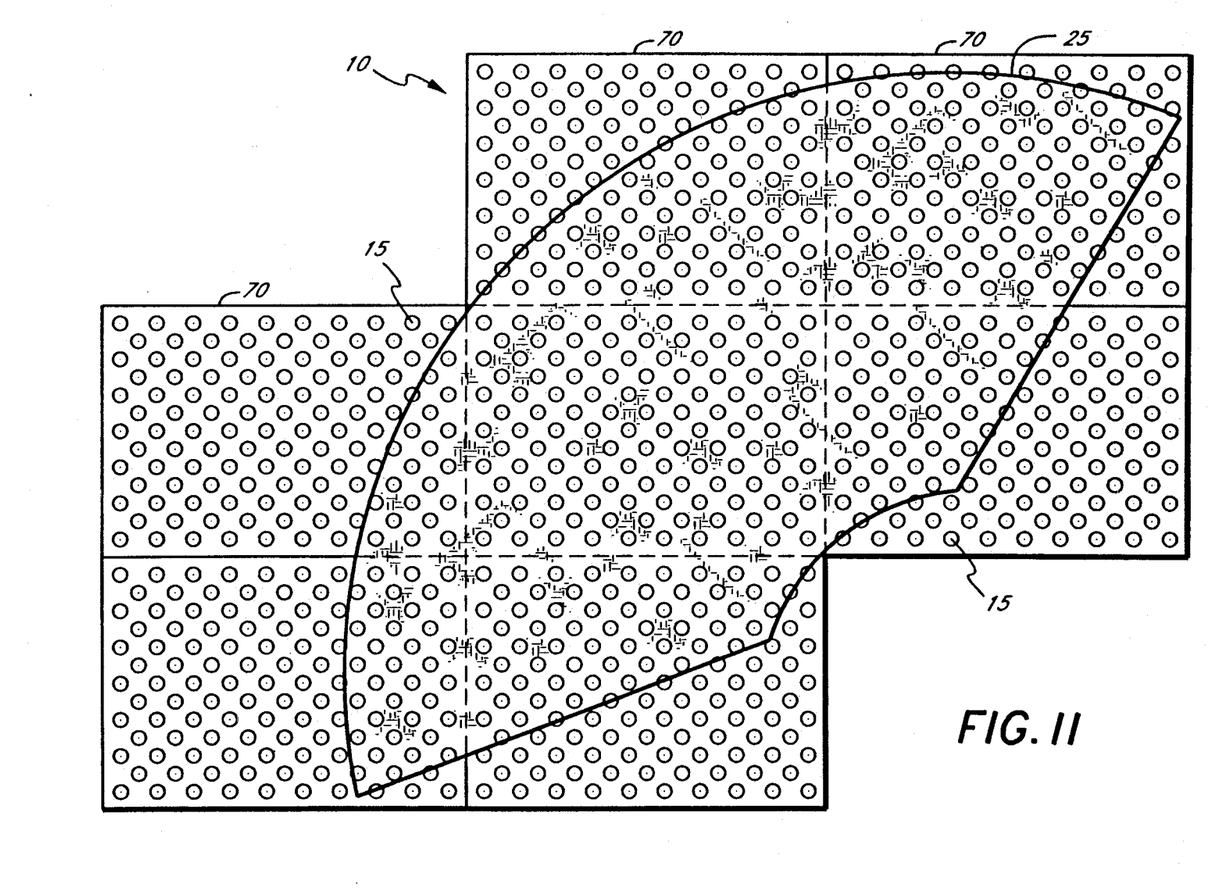
FIG. 11 is a plan view of a plurality of flexible mold sections joined together with a fabric sheet thereon which is larger than any of the sections.

In many applications, it is desired to produce a perforated product of large dimensions, e.g. products having as much as four square feet of surface area or larger. We have found that in order to accommodate the large materials necessary to produce these products, it is difficult to produce a flexible mold 10 of one section. Thus, in accordance with a preferred embodiment of the present invention as seen in FIG. 11, the flexible mold 10 is comprised of a plurality of flexible mold sections 70 which are provided with any of a variety of joints for joining the sections together. The flexible mold sections 70 are preferably rectangular, and more preferably square, in order to allow for convenient joining of the sections 70. In the preferred embodiment, the sections 70 are comprised of two foot squares having a plurality of spaced studs 15 projecting therefrom.

Figure 8:
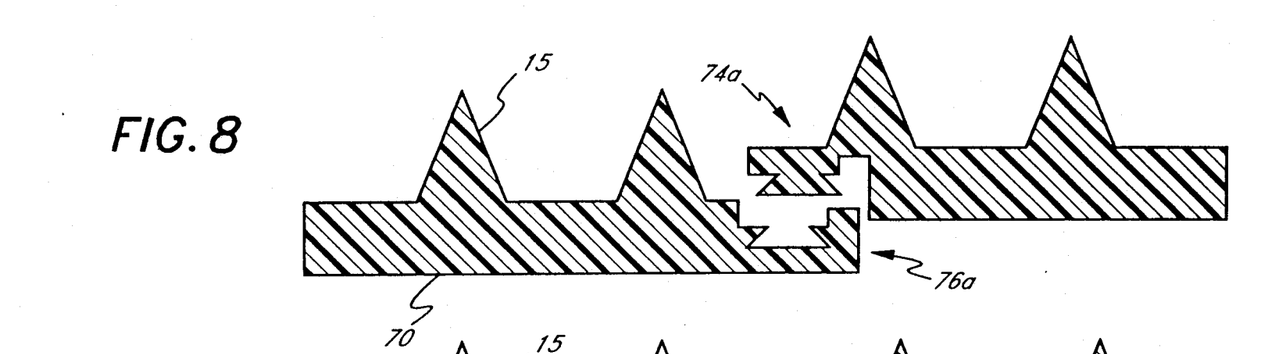
FIG. 8 is a sectional view of a dovetail joint between two flexible mold sections of the present invention.
Figures 9, 10:
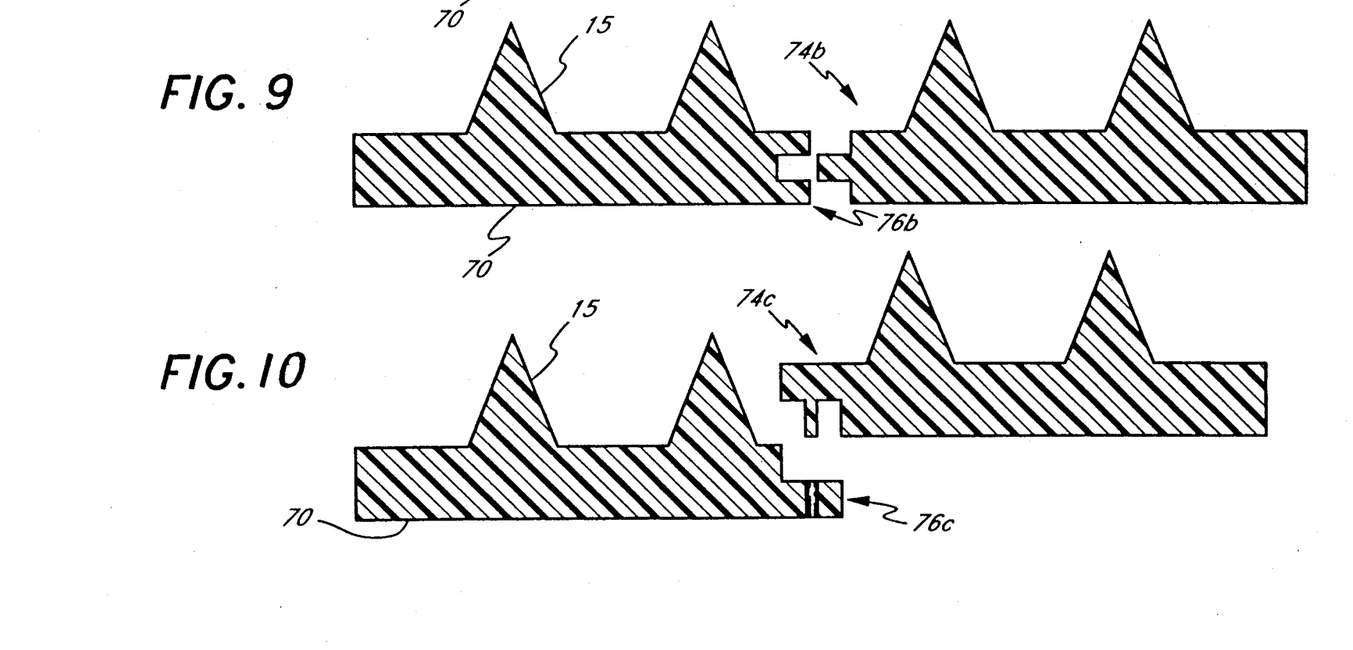
FIG. 9 is a sectional view of a tongue and groove joint between two flexible mold sections of the present invention.
FIG. 10 is a sectional view of a pinned lap joint between two flexible mold sections of the present invention.

The flexible mold sections 70 can be joined through any of a variety of joints 72. For example, the sections can be joined with dovetail joints 72a as shown in FIG. 8, with tongue and groove joints 72b as shown in FIG. 9, or with pinned lap joints 72c as shown in FIG. 10. In the preferred embodiment, the joints are strengthened through ultrasonic welding or other joining process, such as through the use of adhesives.

The sections 70 of the preferred embodiment have male connectors 74a, 74b, 74c on two adjacent sides and female connectors 76a, 76b, 76c on the other two adjacent sides. In this way any section 70 can be joined to any other section 70, as seen in FIG. 11 through joining of male connectors 74 to female connectors 76. Thus, the size and shape of the flexible mold 10 can be altered by the joinder of sufficient sections to cover the entire surface area of the material 25 to be perforated in accordance with the present invention. For example, with the arc shaped material 25 shown in FIG. 11, having an inner arc length of 135 inches and an outer arc length of 142 inches in FIG. 11, it can be seen that a total of seven 2-foot square sections 70 can be joined to create a flexible mold 10 having sufficient dimensions that the portions of material desired to be perforated do not extend beyond the edges of the flexible mold 10. Thus, the flexible mold 10 can completely cover the portions of the material 25 from which the finished perforated article is to be formed. If the material 25 is larger than the portions of the material from which the finished article is to be formed, then the remainder of the material other than those portions is removed prior to curing.

The flexible mold 10 comprised of a plurality of sections 70 can be used as described hereinabove to produce perforated articles having large surface dimensions. After sufficient mold sections 70 have been joined to create a mold 10 sufficiently large to mold the flattened material 25, the mold is cut to the shape of the flattened finished perforated product or otherwise cut to avoid overlap of the edges of the mold when the mold 10 is bent into the desired contours of the finished product. Without such cutting, overlap of different portions of the mold 10 would interfere with the bending of the flexible molding structure 50 prior to the substantially complete partial cure step.

In a preferred embodiment of the present invention, the arc of material 25 shown in FIG. 11 is formed to make a somewhat cone-shaped article on the forming tool 55 prior to the substantially complete partial cure of the article. Of course, prior to bending the material 25 on the mold 10, the mold 10 must be cut to avoid overlap on the forming tool 55.

It will be appreciated that certain variations may suggest themselves to those skilled in the art. The foregoing detailed description is to be clearly understood as given by way of illustration, the spirit and scope of this invention being limited solely by the appended claims.

What is claimed is:

1. A method of manufacturing a perforated article, comprising:
   a. providing a woven material impregnated with a high flow curable resin, wherein portions of said material are desired to form part of said perforated article;
   b. providing a flexible mold constructed from a plurality of mold sections, said flexible mold having a plurality of spaced studs projecting from a surface of said mold and a size and shape such that the flexible mold can completely cover the desired portions of said material;
   c. providing a pressure transmitting pad having stud holes positioned and sized so as to permit said studs on said flexible mold to fit within said stud holes;
   d. placing said woven material in contact with said pressure transmitting pad;
   e. placing said flexible mold in contact with said woven material, aligning said studs in said flexible mold with said stud holes in said pressure transmitting pad, thereby forming a composite structure;
   f. applying pressure to said composite structure so as to push said studs through said woven material into said stud holes;
   g. removing said pressure transmitting pad;
   h. forming said flexible mold having said woven material thereon to a desired contour by placing said flexible mold on a forming tool having said desired contour;
   i. partially curing said high flow curable resin impregnated in said woven material for a time sufficient to provide a substantially rigid article such that the article may be removed from said flexible mold without causing a permanent deformation of said article;
   j. removing the woven material from said flexible mold after the partial cure of the resin; and
   k. further curing said curable resin after removing the woven material from the mold.

2. A method of forming a large perforated article having a desired contour from a piece of flat woven material impregnated with curable resin, comprising:
   constructing a flexible mold having a plurality of spaced studs thereon by joining a plurality of mold sections each having a plurality of spaced studs thereon;
   applying said woven material to said flexible mold such that the woven material overlies at least two of said sections;
   forcing said woven material onto said studs so that said studs protrude through said woven material;
   bending said flexible mold to said desired contour; and
   curing said resin when said material is in said desired contour.

3. The method of claim 2, additionally comprising cutting said flexible mold to the shape of the portions of said material from which said article is to be formed.

4. The method of claim 2, additionally comprising removing, prior to the curing step, the portion of said material other than the portions of said material from which said article is to be formed.

5. The method of claim 2, wherein the forcing step comprises forcing a pressure transmitting pad having a plurality of spaced holes sized and spaced to receive said studs onto said mold after the applying step.

6. The method of claim 5, wherein said pressure transmitting pad is produced by a method comprising:
   providing flexible material in uncured form;
   applying the flexible mold to the uncured material;
   curing the uncured flexible hard material; and
   removing the flexible mold.

7. The method of claim 6, additionally comprising cutting said flexible mold to the shape of the portions of said material from which said article is to be formed, wherein said pad is produced after said mold is cut.

8. The method of claim 2, wherein said curing step is a partial curing step sufficient to provide a substantially rigid article such that the article may be removed from said flexible mold without causing a permanent deformation of said article, and additionally comprising removing said article from said mold and completing the curing of said article.

9. The method of claim 2, wherein said high flow resin comprises an epoxy resin polyimide resin or BMI resin, and said flexible mold comprises a material selected from the group consisting of polypropylene, polyethylene and polyether ether ketone.

10. A method of manufacturing a perforated article, comprising:
    forming a flexible mold by joining a plurality of mold sections having male and female joints thereon, said male and female joints capable of cooperating to join one mold section to another mold section;
    applying a material impregnated with resin to said flexible mold such that the portions of said material overlie two mold sections;
    using a forming tool to bend said flexible mold to a desired shape;
    particularly curing said resin after the bending step, such that said material conforms to the forming tool during the curing step; and
    removing the material from the flexible mold after the curing step.

11. The method of claim 10, wherein the removing step is performed while said mold is at a temperature between 100° F. and 250° F.

12. The method of claim 10, wherein said mold sections are rectangular.

13. The method of claim 12, wherein said mold sections are square and two adjacent sides of said square have female joints and the other two adjacent sides have male joints.

14. The method of claim 10, wherein the curing step is performed at a temperature below the cure temperature of the resin.

15. The method of claim 14, wherein the curing step is performed at a temperature within the range 250° F. to 300° F.

16. The method of claim 10, wherein said resin comprises a high flow resin and said material comprises woven graphite fibers.

17. The method of claim 10, wherein said joints are selected from the group consisting of tongue and groove joints, pinned lap joints and dovetail joints.

18. The method of claim 8, wherein the step of removing said woven material comprises flexing the flexible mold, thereby separating said woven material from the mold.

19. The method of claim 10, wherein the removing step comprises flexing the flexible mold, thereby separating said woven material from the mold.

* * * * *